Aug. 8, 1944.  H. J. FINDLEY  2,355,151
AUTOMOBILE BODY HEATER
Filed Dec. 6, 1940
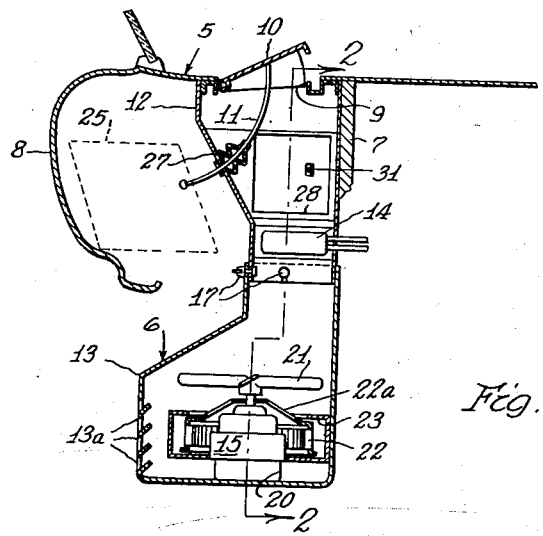
Fig.1.
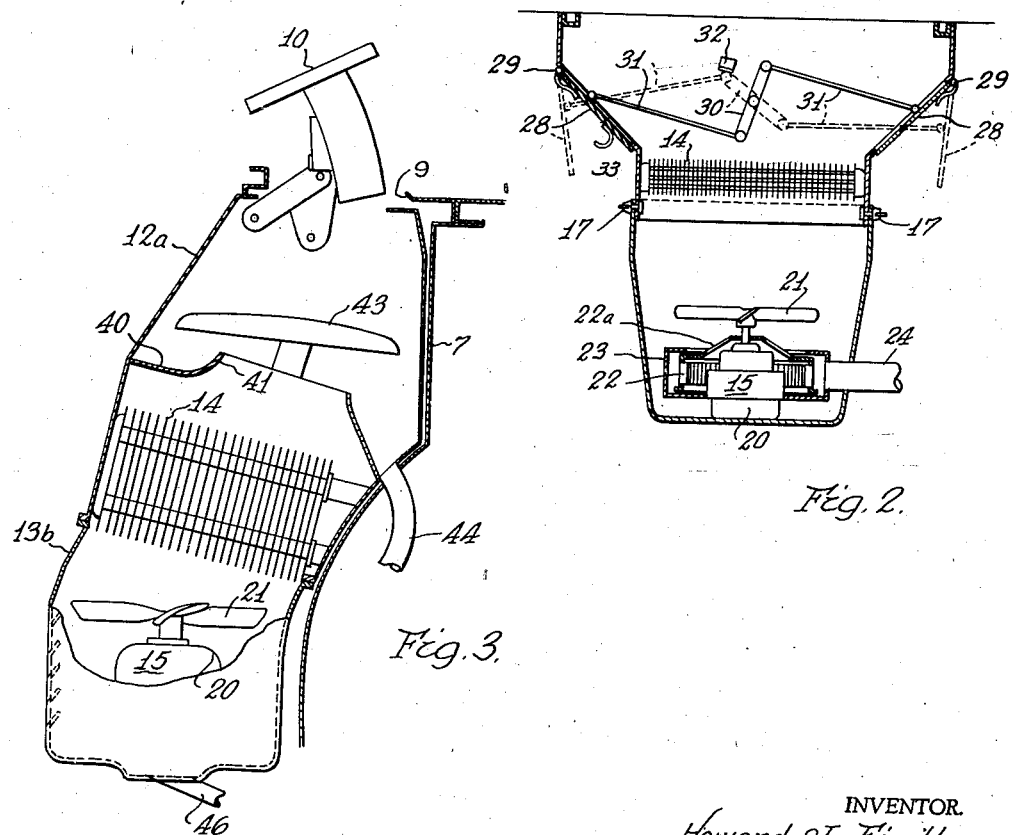
Fig.2.
Fig.3.
INVENTOR.
Howard J. Findley
BY John F. Stark Patented Aug. 8, 1944

2,355,151

UNITED STATES PATENT OFFICE 2,355,151

AUTOMOBILE BODY HEATER

Howard J. Findley, Shaker Heights, Ohio, assignor to Eaton Manufacturing Company, Cleveland, Ohio, a corporation of Ohio Application December 6, 1940, Serial No. 368,767

3 Claims. (Cl. 98—2)

This invention relates to vehicle heaters in general, and more particularly, concerns an improved arrangement and construction of dash mounted heat-exchangers of the circulating fluid type.

The need has recently arisen, concurrently with the advent of vehicle heat-exchangers of the so-called air conditioning type having a fresh air intake at the cowl ventilator opening, for means to conveniently and tightly seal the opening in the fresh air box through which the usual rod for actuating the cowl ventilator lid extends; and also to positively trap inducted moisture in the wind box. Furthermore, since automobile radios have been transferred to a central grilled mounting upon the instrument panel with the radio chassis and speaker extending laterally therebehind, it has become difficult, if not impossible in some instances, to install a radio in this location subsequent to a heater installation, without first disconnecting the same and setting it aside to provide clearance room for locating the radio in its fixed position. It will be apparent that in heaters of the circulating fluid type this necessitates draining the automobile radiator and disconnecting conduits to the vehicle heat-exchange core. Accordingly, to this end, the present invention obviates these difficulties by a novel and improved construction and arrangement of parts.

Among the objects of the present invention is the provision of a vehicle air conditioning device consisting of a heat-exchange element, an air impeller element and a split casing enveloping these elements whereby the air impeller element and the casing part housing the same may be conveniently separated from the remainder of the device without removing or disturbing the heat-exchange element and its connections; the provision in a heat-exchanger, as above described, comprising a relatively shallow core element mounted flush against the vehicle dash so as to afford maximum clearance room with the instrument panel when the depending rearwardly-extending, air impeller element is dropped away; the provision in a device, as above described of a stationary casing element, surrounding said fixed core element, connected to the surrounding wall of the cowl vent opening and having a rubber bellows-type boot sealing off the opening through the casing element where the cowl lid actuating lever projects so as to obviate any leakage or air escapement from bypassing the core to the passenger compartment, and including built-in moisture trapping and draining means; the provision in a device, as above described, of novel toggle mechanism for controlling the operation of one or more trap doors or valves for by-passing air around the core element direct to the passenger compartment; the provision in a device, as above described, of means for using the by-pass or trap doors in the casing for recirculated air inlet openings when the fresh air inlet supply means is closed; the provision in a vehicle heat-exchanger comprised of a fixedly mounted air box with a heat-exchange core therein and a depending housed air impelling portion removably secured thereto, of moisture trapping and draining means incorporated in said air box and air-impelling housing portion; the provision in a device, as above described, of double fan means mounted upon one end of a common driving motor including a blower housing surrounding one of the fans and having an outlet opening for delivery of air from the heater casing to the vehicle windshield.

Further and other objects and advantages of the invention reside in the novel combination and arrangement of parts to be hereinafter described, when considered in conjunction with the accompanying drawing forming a part of this specification, and pointed out with particularity in the appended claims.

In the drawing like reference characters denote corresponding parts in the several views, and in which:

Fig. 1 is a vertical sectional view through a portion of a vehicle body illustrating a preferred form of heat-exchanger incorporating the teaching of this invention; and Fig. 2 is a sectional front elevational view of the heater shown in Fig. 1.

Fig. 3 is a vertical sectional view similar to Fig. 1 but illustrating a slightly modified heat-exchange structure.

Now having reference to the drawing there is shown a longitudinal sectional view through a portion of a vehicle body adjacent the cowl, generally designated 5, and illustrating a heat-exchanger 6 mounted adjacent the dash 7 in spaced relation behind the instrument panel 8 and below a conventional cowl ventilator opening 9, covered by a movable lid member 10 which is controlled by an actuating lever 11. The heat-exchanger generally designated 6 has a two-part or split casing 12 and 13 enveloping, respectively, a heat-exchange element 14 and a blower or air impelling element 15. The heat-exchange element 14 is of the circulating fluid type and has the conventional supply and discharge connections extended through the dash and joined into the engine circulating system (not shown). It will be noted the heat-exchange element is relatively shallow in its dimensional width extending laterally from the inner face of the dash 7 but is of elongated length and positioned flush against the dash so as to take up a minimum amount of room. The upper end of this casing part 12 is expanded and sealed off in surrounding relation to the under side of the cowl ventilator opening 9 in any conventional manner, whereby, under forward motion of the vehicle, fresh air from outside will be deflected thereinto by the cowl lid or closure 10. The lower portion of this casing part extends in depending relation from the cowl opening to envelope the core element 14, and terminates in a reduced open end section, adjacent the lower face of the core element, having any well-known removable fastening means 17 secured thereto, such as the slotted openings and wing nuts shown.

The lower casing part 13 has a reduced upper end opening and section, complementary in size and shape to the lower end of casing part 12, to which it is arranged to be detachably secured in any well-known manner by the fastening means 17. This casing part depends therefrom in a somewhat expanded section to envelope the air impelling element 15 and has louvered discharge openings 13a for delivery of tempered fresh air directly to the passenger compartment. The air impelling unit 15 consists of a motor 20 having one propeller fan 21 mounted upon the shaft thereof, and a second centrifugal or blower fan 22 secured therebelow upon the same end of the common shaft. A blower housing 23 surrounds the centrifugal fan 22 and motor, thereby defining a separate air channel from the periphery of which extends outward of the casing 13 a discharge pipe 24 where it is arranged to be covered by a flexible conduit and delivered to the inner surface of the windshield. It will be apparent the opposite ends of the blower casing 23 are open adjacent the longitudinal axis thereof, and the adjacent hub 22a of the blower fan 22, extended therethrough, has complementary openings, whereby a portion of the air moved through the core element by the propeller fan 21 and discharged axially therebelow may be picked up by the open ends of the blower rotor. The blower casing 23 is retained in fixed position in the casing part 13 in any suitable manner.

From the foregoing description it will be obvious that by merely releasing the fastening means 17 the lower casing part 13, and the fixed enveloped air impeller element 15 therein, may be easily removed as a unit or sub-assembly to afford sufficient clearance below the instrument panel 8 to permit the insertion upward of a radio chassis, generally designated 25 and shown in broken lines, between the forward wall of the casing and the rear marginal edge of the instrument panel. In this manner it is not necessary to drain the vehicle radiator and disconnect the heat-exchange core tubes, as has been necessary in the past, in so far as this applicant is aware, to permit the installation of a radio subsequent to the heat-exchanger installation, as generally the clearance space, for maneuvering the radio into position behind the instrument panel crowded with gauges, mechanical attachments or wiring looms, is at a premium.

Since the movable cowl vent closure 10 is conventionally controlled by an actuating lever 11 which must project through the wall of the upper casing part 12 there has been provided a novel use for a rubber bellows-type boot 27, as shown, to seal off the opening in the casing wall. The boot 27 is preferably provided with a relatively small opening at one axial end which is stretched over the perimeter of the lever within the casing and the other end of the boot is sealed to the casing wall in any well known manner. This bellows boot thus prevents any annoying drafts of cold air by-passing the core element and striking the occupant's feet.

Under certain operating conditions, for example, in the summer time or when it is desired to use recirculated air for vehicle heating, as when raining or snowing, there is provided one or more valves or closures 28 by-passing the heat-exchanger and discharging air directly to the passenger compartment. In the present instance the closures 28 are two in number and mounted upon opposite sides of the upper casing 12 by spring pressed pivotal hinge means 29 normally maintaining the closures shut. A novel toggle mechanism consisting of a pivoted lever 30, secured to the rear casing wall, has secured thereto at opposite ends the links 31 which are pivotally fastened to the inner face of the closures 28. The toggle mechanism includes a stop 32 also fastened to the rear wall of the casing which is so positioned as to be over-center for the right hand closure 28 as viewed in Fig. 2, and not over-center for the left hand closure 28. In this manner, a hand hold 33 which is secured to the left hand closure 28 is arranged to be grasped to open or close both valves simultaneously. That is to say, any accidental external shocks upon the right hand closure will not permit the closing of the closures and only a positive movement applied to the hand hold will secure adjustment movement of the same. It will also be obvious that, under adverse weather conditions, as aforementioned, when it is raining or snowing, and operation of the heat-exchanger is necessary, the cowl ventilator lid 10 may be closed and the closures 28 opened so as to provide for reception of recirculated air from the vehicle body interior above the core element and moved therethrough under the action of the propeller fan and out the lower casing outlets 13a or the blower casing outlet 24.

In Fig. 3 there is shown a heat-exchanger structure embodying some of the principal features of the previously described device, such as the split casing enveloping the heat-exchange means in one casing portion and the air impeller element in another casing portion. Accordingly, corresponding elements, although somewhat modified in form, have been given like numerals with a subscript to distinguish therefrom, and only the distinctive members have been given new numerals.

The split casing structure comprises an upper fixed wind box 12a which is secured in sealing relation beneath an air inlet or cowl opening 9 and air travel therethrough is controlled by an adjustable cowl closure member 10. The lower casing portion 13b is removably secured in depending relation, by any suitable means which can be readily detached, such as fasteners 17 previously described, to the upper wind box 12a and forms therewith a heat-exchange chamber. A heat-exchange means 14 is disposed across the lower part of the wind box 12a to temper air moved therethrough, while the air impeller element 15 comprising the driving motor 20 and fan 21 is located in the lower casing part 13b adjacent the lower face of the heat-exchange means to circulate tempered air moved therethrough. All this structure is substantially the same as the previously described device.

Within the wind box, which is adapted to be permanently fixed in the vehicle, also as in the previous instance, is a plate member 40 disposed transversely across the air channel therethrough and which has a central raised portion with a large aperture 41 therein overlying the heat-exchange means 14. An annular mushroom-like member 43 is secured to the apertured member 40 and baffles the opening 41 therein but is disposed in axial spaced relation thereabove. From the low side of the plate member 40 a drain tube 44 extends to a point below the vehicle. In the lower portion of the housing 13b a second drain tube 46 also conducts any moisture collected therein to a point below the vehicle. This construction thus provides a double moisture trap, because, while the major quantity of moisture will be precipitated and shed by the mushroom-like annulus 43, directly baffling the opening 41, and conducted away by drain tube 44, any vapors or excess moisture entrained in the air and carried thereby in the air stream to the air impeller 15 will be drained off by the second drain tube 45, before it can overflow or be circulated into the vehicle passenger compartment. The operation and function of this heat-exchanger, including the attendant advantages thereof, are believed self-evident from the disclosures applied to the previous device and needs no further explanation.

From the foregoing disclosures it will be apparent there has been described a new and novel heater construction embodying component parts which, among other things, accomplish the objects and advantages of the invention first enumerated, although it is not the intention to be limited to the specific embodiment of the invention described somewhat in detail, which is merely for purposes of illustration, as many other formal modifications will present themselves in actual practice to those skilled in the art to which this invention relates from the teaching thereof without departing from the spirit and substance of the invention as defined by the scope of the following claims.

What I claim is:

1. A vehicle ventilator composed in part of separable housing sections, an upper housing section having an upper air inlet and adapted to be permanently secured in surrounding relation beneath an outside air inlet opening in an upper wall of the vehicle ahead of the windshield and including a lower end with an outlet opening, a heat-exchange element in said upper section disposed transversely across the lower outlet opening therein, a lower housing section detachably secured at its upper end to the lower end of the upper section and having a lower opening communicating with the passenger compartment, air impelling means in the lower end of said detachable lower section adapted to move air to be tempered through the heat-exchange element of the upper section and discharge it through the lower opening in said lower section into the passenger compartment, centrifugal fan means driven by said air impelling means disposed in a separate blower housing arranged to receive a portion of the tempered air moved by said air impelling means through said lower section, and conduit means associated with said blower housing and extended through a wall of the lower section for conducting air to the vehicle windshield.

2. A vehicle ventilator composed in part of separable housing sections, an upper housing section having an upper air inlet and adapted to be permanently secured in surrounding relation beneath an outside air inlet opening in an upper wall of the vehicle ahead of the windshield and including a lower end with an outlet opening, a heat-exchange element in said upper section disposed transversely across the lower outlet opening therein, a lower housing section detachably secured at its upper end to the lower end of the upper section and having a lower opening communicating with the passenger compartment, air impelling means in the lower end of said detachable lower section adapted to move air to be tempered through the heat-exchange element of the upper section and discharge it through the lower opening in said lower section into the passenger compartment, said permanently mounted upper housing section having means interposed in the air channel between the outside air inlet opening and said heat-exchange means therein for baffling direct passage of air thereto and so arranged as to precipitate entrained vapor and water from the air and conduct it to a point outside the vehicle, and said detachable lower housing section having a moisture drainage means in the lower portion thereof for conducting away excess vapors not precipitated from the air stream by said first mentioned moisture precipitator whereby substantially all entrained vapors are removed from the air before delivery to a compartment of the vehicle.

3. A vehicle ventilator composed in part of separable housing sections, an upper housing section having an upper air inlet and adapted to be permanently secured in surrounding relation beneath an outside air inlet opening in an upper wall of the vehicle ahead of the windshield and including a lower end with an outlet opening, a heat-exchange element in said upper section disposed transversely across the lower outlet opening therein, a lower housing section detachably secured at its upper end to the lower end of the upper section and having a lower opening communicating with the passenger compartment, air impelling means in said detachable lower section adapted to move air to be tempered through the heat-exchange element of the upper section and discharge it through the lower opening in said lower section into the passenger compartment, centrifugal fan means driven by said air impelling means disposed in a separate blower housing arranged to receive a portion of the tempered air moved by said air impelling means through said lower section, and conduit means associated with said blower housing and extended through a wall of the lower section for conducting air to the vehicle windshield.

HOWARD J. FINDLEY.